INVENTORS
TAKENORI TANIMURA
YOICHIRO ITO

BY Browdy and Neimark

ATTORNEYS

United States Patent Office 3,784,467
Patented Jan. 8, 1974

3,784,467
DROPLET COUNTERCURRENT CHROMATOGRAPHY
Takenori Tanimura, Tokyo, Japan, and Yoichiro Ito, Chevy Chase, Md., assignors to the United States of America as represented by the Secretary of the Department of Health, Education, and Welfare
Filed May 26, 1971, Ser. No. 147,133
Int. Cl. B01d 15/08
U.S. Cl. 210—31 C   7 Claims

ABSTRACT OF THE DISCLOSURE

A droplet countercurrent chromatographic all-liquid separation technique for partitioning a solute between a steady stream of droplets of moving phase and a column of surrounding stationary liquid phase. Milligram quantities of biochemicals may be separated using this process.

---

Figure 1:
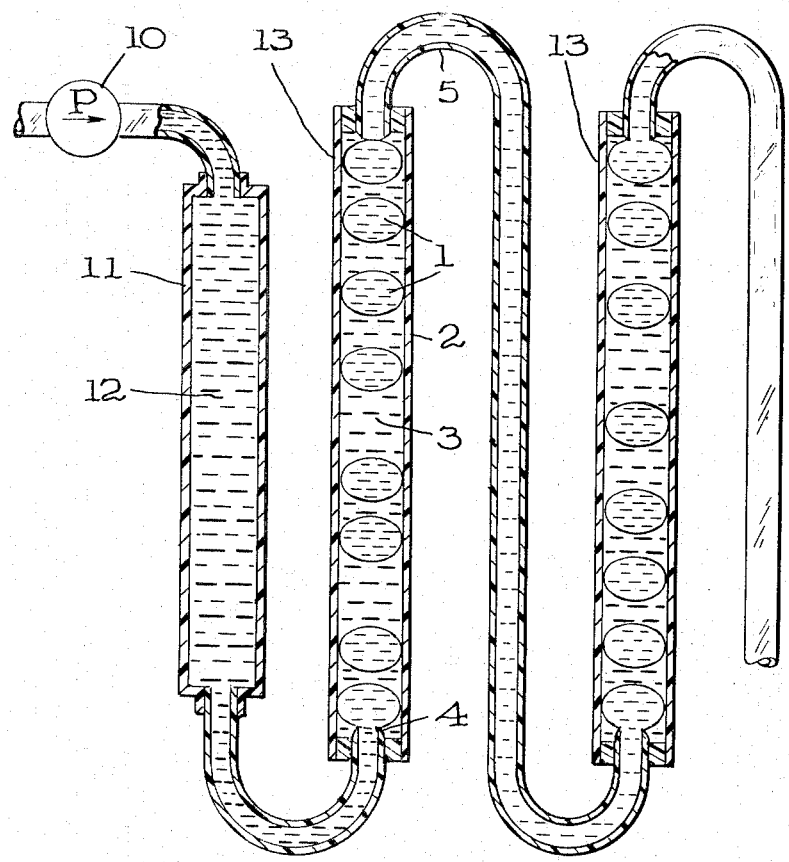

The present invention relates to droplet countercurrent chromatographic technique utilizing all-liquid separation based on the partitioning of solute between a steady stream of droplets of moving phase and a column of surrounding stationary liquid phase.

Chromatography is the name given to a particular family of separation techniques. The feature common to all chromatographic methods is the use of two phases, one stationary and the other mobile; separations depend on the relative movement of these two phases.

Chromatographic methods are classified according to the nature of the stationary phase of which may be a solid or a liquid. If the stationary phase is a solid, the method is known as adsorption chromatography; if a liquid, as partition chromatography. This invention is a form of liquid-liquid chromatography wherein droplets of solute move through a stationary column of liquid phase by gravity.

Generally, liquid-liquid chromatography and countercurrent distribution are known analytical procedures for the purification or identification of a wide variety of chemical compounds, however, these techniques have important analytical and physical limitations.

More specifically, in liquid-liquid chromatography the solid adsorbent is replaced by a stationary liquid which is normally only partly miscible with the flowing liquid. A solute will distribute itself between the two liquid phases (stationary and mobile) according to its partition coefficient. For chromatographic purposes the stationary liquid is supported on a solid which, as nearly as possible is inert to the substances to be separated. The greatest difficulty (more or less unavoidable) when a solid has to be used is the incursion of adsorption effects. Even if the surface of the support is completely covered with liquid, adsorption effects can still make themselves felt. As complete coverage of the surface is not easy to achieve adsorption may be a major influence on the separation. As far as liquid phase chromatography on columns is concerned it is probably true to say that the division into adsorption and partition methods is of practical, rather than theoretical significance.

Thus adsorption of solute to the support used in liquid-liquid partition chromatography often causes peak tailing and also the capacity of this technique is low. Although solid supports are not used in countercurrent distribution, the technique is more cumbersome and generally has less resolving power, an aspect of great importance in chromatographic analysis.

An important advantage of the present all-liquid separation technique, is that it does away with the need for a support by allowing one solvent to flow dropwise through the other.

Another object of this invention is to provide a chromatographic technique of high resolving power, very compact, simplistic in design and easily operable.

Another object of this invention is to provide a chromatographic technique for the separation of milligram quantities of biochemical compounds.

Figure 2:
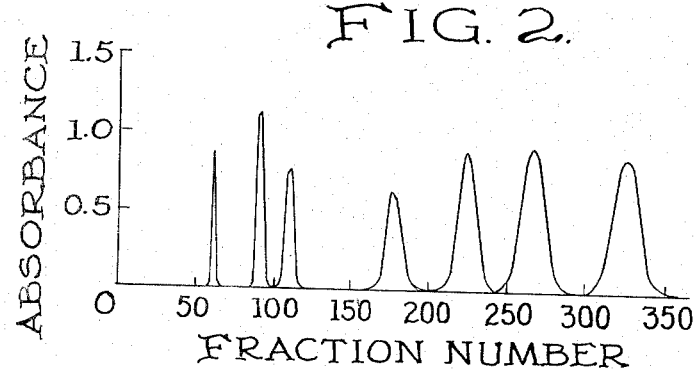

Other objects, advantages and novel features of the invention will become apparent from the following detailed description of the invention when considered in conjunction with the accompanying drawings wherein:

FIG. 1 is a schematic view of a sample tube connected to a pump and an assembly of columns, and transfer tubing; and FIG. 2 is a graphic representation of the separation of DNP amino acids.

In typical operation, the stationary phase 3 is pumped (see FIG. 1) into an assembly of columns 13. The solute (sample to be partitioned) is dissolved in a mixture of both stationary and moving phases and this solution 12 is placed in a sample tube 11 with suitable high pressure fittings. The moving phase is then pumped (see pump 10) through the top of the tube, thereby quantitatively replacing the sample solution 12 by passing it into the assembly of columns 13 to affect partitioning. The stationary phase in each succeeding column of the assembly having an affinity for the solute effectively partitions the solute (contained in droplets of moving phase) between the moving 1 and stationary phase 3 in each column according to its partition coefficient. Thus, the droplets having reached the end of a column still contain some solute until the solute has been effectively partitioned by being passed through the assembly of columns 13. The sample tube 11 and assembly of columns may be mounted vertically in series and are connected by narrow bore tubing 5.

As shown, the droplet countercurrent chromatographic technique of the present invention is carried out by passing droplets of moving phase 1 through a column 2 of stationary phase 3 in order to affect partitioning of a solute between the phases. The moving phase 1 may be either heavier or lighter than the stationary phase 3. When heavier, the moving phase is delivered at the top of the column, and when lighter through the bottom.

More specifically, when the moving phase is lighter than the stationary phase, the lighter moving phase is introduced at the bottom of a column of surrounding stationary phase through a tip 4 chosen to give a steady stream of droplets about as large in diameter as the bore of the column. When a droplet reaches the top of the column, it is delivered to a succeeding column of stationary phase through narrow bore Teflon tubing 5 in order to be further partitioned. This process is repeated until the solute has been effectively partitioned between the moving and stationary phases. The fine Teflon tubing, interconnecting the individual columns, preserves the integrity of the partitioning with minimal longitudinal defusion. A small amount of stationary phase may enter the Teflon tubing but the effect is insignificant.

In moving through the columns, turbulence within the droplet promotes efficient partitioning of the solute between the two phases. The expected mixing of the stationary phase along the length of the column is minimized by the formation of ascending series or stacks of proper-sized droplets, having minimal spaces between and diameters near that of the internal bore of the column, which serve to divide the stationary liquid into distinct segments.

With a given set of phases, generation of droplets of proper size is a function of column bore, the interface of the immiscible liquids, the flow rate of the moving phase, and the diameter of the inlet tip. In general, small-bore columns (that is less than 1.0 mm.) produce plug flow in which the entire contents of the tube are displaced. If the bore is too large, then large droplets which form do not allow efficient partitioning of the solute. If small drops are introduced, some will coalesce into slower-moving larger droplets which move even more slowly. This can occur throughout the length of the column, sometimes with the result that large segments of the moving phase ascent the column, which obviously prohibits the efficient partitioning of the solute. Introduction of the moving phase at too fast a rate is also deleterious, as the droplets abut one another and often coalesce into cylinders.

Also, the column walls should not have a high affinity for the moving phase. Thus, if the moving phase is aqueous, and the column is glass, the walls may be silylated to promote droplet formation; otherwise the liquid wets the walls and moves as a stream. The columns themselves may be formed from glass, Teflon or metal, ceramic, or plastics. A Beckman Accu-Flow pump, equipped with a sidearm reservoir for damping pulsations can be used to deliver a constant flow of droplets. The rate should be set at the highest flow compatible with a steady generation of discrete droplets. The highest permissible flow gives droplets which are barely separated.

The apparatus and methodology of this invention will be described in greater detail in the following example with reference to the drawings. However, it is to be understood that the following description is given by way of illustration only and not of limitation and that deviations are possible within the spirit of the invention.

An assemby used to separate dinitrophenyl (DNP) amino acids (solute) consists of 300 silylated glass columns of standard Pyrex tubing (0.6 mm. in wall thickness and 3 mm. in outside diameter) 60 cm. long connected by AWG 24 standard-wall Teflon tubing. The system has a capacity of about 460 ml. excluding the volume of moving phase in the Teflon tubing which is 80 ml. The solvents in this example were chloroform, acetic acid, and 0.1 N HCl, 2:2:1 by volume. The solvents are mixed and allowed to equilibrate in a separatory funnel. The chloroform (stationary phase) is pumped into the assembly of columns. Then DNP amino acids, 2 to 10 mg. each, are dissolved in 3 ml. of a 1:1 mixture of stationary chloroform and moving aqueous phases, and this solution is placed in a 5 ml. sample tube, for example a modified 5 ml. Mohr pipette with suitable high pressure fittings. The aqueous phase is then pumped through the top of this tube at a flow rate of 16 ml./hour (10.2 atm.) in order to quantitatively displace the solute from the sample tube. Fractions, each 3 ml., were collected, and their absorbances were determined at 350 mm.

FIG. 2 shows symmetrical, completely resolved peaks for each component in the mixture. Peaks (partition coefficients are shown in parentheses) in order of elution are: dinitrophenyl-L-ornithine (>100), dinitrophenyl-L-serine (3.8), dinitrophenyl-L-threonine (2.4), N,N'-di(dinitrophenyl) cystine (0.94), dinitrophenyl-beta-alanine (0.71), dinitrophenyl-L-alanine (0.56), and dinitrophenyl-L-proline (0.45).

The efficiency of the separation calculated from the peak of dinitrophenyl alanine was 900 theoretical plates.

The number of theoretical plate is calculated using the formula $N=(4R/W)^2$, where N is the number of theoretical plates, R is the elution volume, and W is the peak width volume. The elution volume does not include the volume of the moving phase in the Teflon tubing since this volume is merely in transit and not involved in the partitioning process.

The present apparatus and methodology is well suited to the separation of milligram quantities of peptides, ribonucleic acids, lipids and similar substances.

It will be obvious to those skilled in the art that various changes may be made without departing from the scope of the invention and the invention is not to be considered limited to what is shown in the drawings and described in the specification.

What is claimed is:

1. A droplet countercurrent chromatographic process utilizing all liquid separation, comprising the steps of passing a steady stream of droplets of moving phase liquid through a column of stationary phase liquid by forming a steady stream of individual droplets within said column; partitioning of solute between the steady stream of droplets of the moving phase liquid and the column of surrounding stationary phase liquid; and delivering the droplets having reached the end of said column to the opposite end of a succeeding column containing additional stationary phase liquid in order to affect further partitioning.

2. The process of claim 1, wherein said droplets of moving phase liquid are passed through substantially vertical columns.

3. The process of claim 1, wherein said steady stream of droplets of moving phase liquid have a diameter approximately equal to that of said column.

4. The process of claim 1, wherein in the passing step the rate of introduction of the droplets is such as to affect efficient partitioning of the solute.

5. The process of claim 1, wherein the moving phase liquid is lighter than the stationary phase liquid, and the passing step comprises introducing the moving phase liquid, at the bottom of the column.

6. The process of claim 1, wherein the moving phase liquid is heavier than the stationary phase liquid, and the passing step comprises introducing the moving phase liquid at the top of the column.

7. The process of claim 6, wherein in the delivering step, the droplets having reached the end of said column are delivered to the next column through narrow bore tubing.

References Cited

UNITED STATES PATENTS

| | | | |
|---|---|---|---|
| 3,458,437 | 7/1969 | Ouano | 210—31 C |
| 3,267,646 | 8/1966 | Kauss et al. | 55—197 |
| 3,640,822 | 2/1972 | Hrdina | 210—65 |

OTHER REFERENCES

Column Partition Chromatography, a Merck & Co, bulletin, 1957, pp. 3 and 4 relied on.

JOHN ADEE, Primary Examiner

U.S. Cl. X.R.

210—198 C